Dec. 19, 1972 C. N. VERHEUL ET AL 3,706,534
MIXING NOZZLE FOR GASES
Filed Nov. 3, 1970
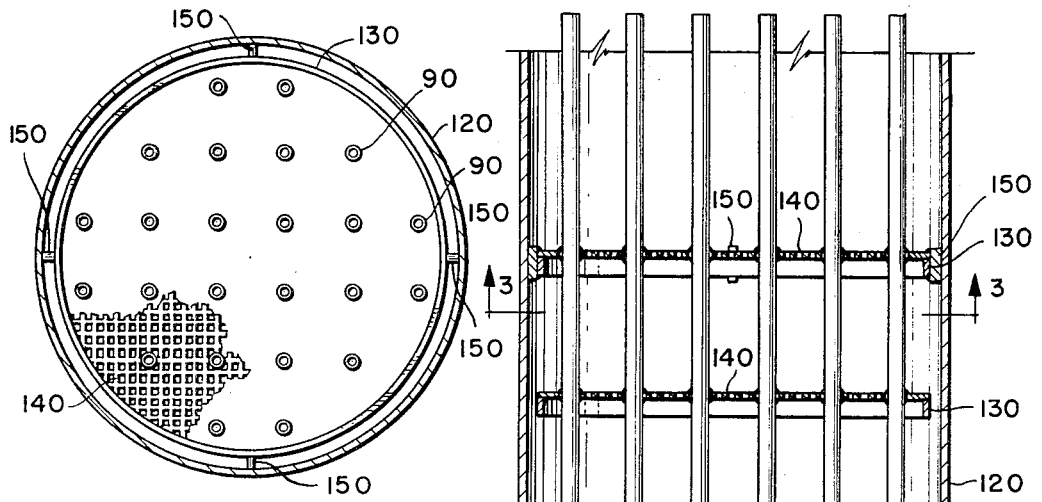
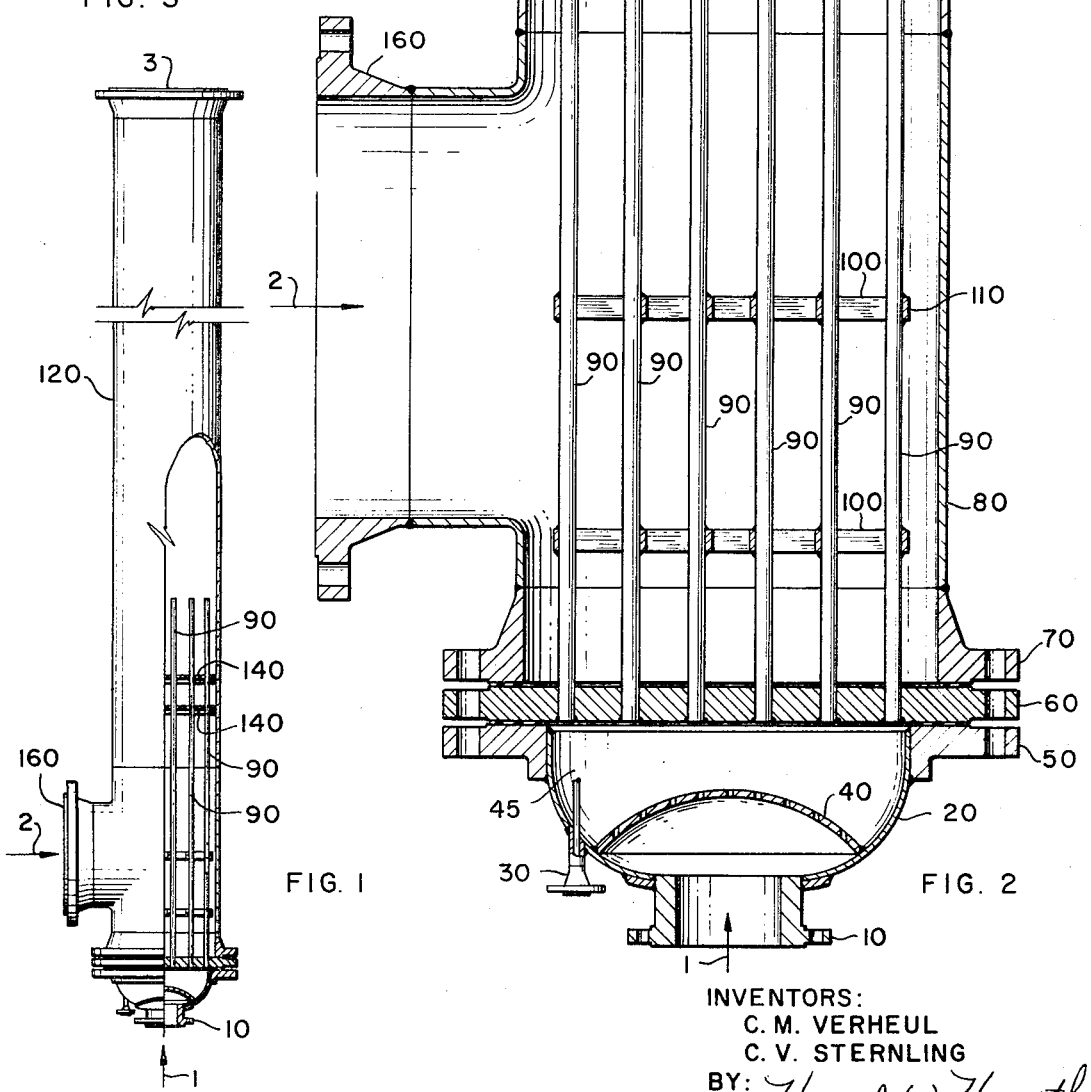
INVENTORS:
C. M. VERHEUL
C. V. STERNLING
BY: Howard W Haworth
THEIR ATTORNEY ial and the other contains oxygen, with the
United States Patent Office 3,706,534
Patented Dec. 19, 1972

3,706,534
MIXING NOZZLE FOR GASES
Cornelis M. Verheul, Amsterdam, Netherlands, and Charles V. Sternling, Walnut Creek, Calif., assignors to Shell Oil Company, New York, N.Y.
Filed Nov. 3, 1970, Ser. No. 86,431
Int. Cl. C07d 1/06; B01j 1/00
U.S. Cl. 23—284                                  6 Claims

ABSTRACT OF THE DISCLOSURE

Intimate mixing of two gaseous streams is effected in an apparatus which comprises a casing containing (a) at one end, a first inlet for the introduction of the first gaseous stream; (b) a second inlet in the side of the casing downstream from the first inlet, through which the second gaseous stream is admitted; (c) an outlet downstream of the second inlet; (d) an imperforate partition positioned between the first and second inlets; (e) at least one perforated partition positioned between the second inlet and the outlet; and (f) a number of tubes, supported by and passing through at one end, the imperforate partition, and at the other end, said perforated partition.

BACKGROUND OF THE INVENTION

This invention relates to an apparatus for mixing at least two gases. More specifically, it deals with mixing a first gas stream, comprising one or more hydrocarbons, with a second gas stream, containing oxygen, with the specific object of avoiding the formation of detonable oxygen-hydrocarbon mixtures. Particularly, an apparatus is disclosed which is useful for mixing ethylene and an oxygen-containing stream prior to their conversion to ethylene oxide.

THE PRIOR ART

Mixing devices of this type are often used in oxidation processes, for instance in the preparation of acetaldehyde from methane, ethylene, and ethanol; acetaldehyde and acetic acid from ethane; isopropanol and acetone from propane; methanol, formaldehyde and acetaldehyde from butane; ethylene oxide from ethylene; and phthalic anhydride from naphthalene or orthoxylene. In these processes, the two gaseous streams are mixed in the desired ratio and subsequently passed to a reactor, where a catalytic or thermal conversion is effected. The oxidation reactor's conditions are carefully controlled so as to maximize the desired product(s) and avoid yield losses to by-products, carbon dioxide and water.

It will be apparent that special measures are required when mixing two gaseous streams, especially when one is a hydrocarbon and the other contains oxygen. The propensity of such mixtures to form explosive or flammable compositions is well known. By devices of the prior art, mixing of the very large gaseous streams occurring in industrial processes was achieved by injecting one gas, by means of a bundle of tubes, into a flowing stream of the second gas. The tubes resembled nozzles, with the result that turbulent flow and thorough mixing of the two gaseous streams was desirably effected in a chamber downstream of the tubes. In the mixing chamber, local and transient compositions are occasionally obtained which lie within the explosive limits of the particular gaseous streams being mixed. However as a consequence of the turbulence, the gaseous mixture which ultimately passed to the oxidation reactor had a composition that was outside the explosive limits. It was, and is, advisable that complete mixing should be achieved as rapidly as possible.

During start-up, shut-down, interruption, or upset of the oxidation process, situations will arise where the prevailing conditions differ radically from the normal situation. For instance, the flow of oxygen-containing gas will gradually increase or decrease. Furthermore, it will normally be important to condition the catalyst in the reactor over many hours, during which time the oxygen flow and concentration is gradually increased until the steady-state flow required by the oxidation has been achieved.

Under some of the unsteady-state conditions noted heretofore, wherein the oxygen flow is less than that normally occurring, the substrate organic compound will diffuse back through the tubes, with the result that explosive compositions may occur. It is essential, in terms of safe operation, that this back-flow of substrate organic material be prevented. The method previously employed to achieve this objective is to maintain the velocity of the gas flowing through the tubes at a sufficiently high level by supplying an inert gas, generally nitrogen, argon, carbon dioxide, or their combinations. Under unsteady-state conditions, enormous quantities of such inert materials are required, particularly during the conditioning period, which may last from several hours to several days.

It would be of advantage to provide a simple and effective means for minimizing (1) the risks of explosive compositions and (2) the quantities of purge inerts.

BRIEF SUMMARY OF THE INVENTION

It has now been found that an improved apparatus for effecting the intimate mixing of two gaseous streams comprises a casing containing (a) at one end, a first inlet for the introduction of the first gaseous stream; (b) a second inlet in the side of the casing, downstream from the first inlet, through which the second gaseous stream is admitted; (c) an outlet downstream of the second inlet; (d) an imperforate partition positioned between the first and second inlets; (e) at least one perforated partition positioned between the second inlet and the outlet; and (f) a number of tubes, supported by and passing through, at one end, the imperforate partition, and at the other end, said perforated partition.

BRIEF DESCRIPTION OF THE DRAWINGS

FIG. 1 is a general assembly in partial section of the present invention.

FIG. 2 is an enlarged section through the casing showing the general arrangement of internals therein.

FIG. 3 is a section taken at line 3—3 of FIG. 2.

DETAILED DESCRIPTION OF THE INVENTION

An important aspect of the invention is the presence of the partition(s) which are provided with openings so that the velocity of the gas stream passing through these openings to the outlet is evenly distributed. Without these partitions, the distribution of velocities of the transversely entering gas at the outlet would be uneven, due to the rectangular deflection which this gas stream is subjected to in entering the casing. The transversely entering gas stream flows by the outlets of the tubes and there generates a suction pressure. Any irregularity in the velocity of this gas has a profound and direct influence on suction pressure. As a result, differences in pressures will occur between the mouths of the tubes, which may result in back diffusion of gases throught the tubes. This is extremely undesirable, since potentially detonable mixtures may form. Back-flow will commence if the pressure across a particular tube due to the longitudinally introduced gaseous stream becomes sufficiently small. The lowest local pressure determines the lower limit of allowable gas flow through a tube. Back-flow of gas from the outlet to the inlet of the first gaseous stream will be initiated upon a decrease in the flow of that stream if there are differences in suction pressure. The apparatus of this present invention results in an even distribution of the velocity of the transversely entering gaseous stream near the ends of the tubes. As a result, the cause of backflow is thus eliminated. Even when the oxygen concentration is low as a result of any of the aforementioned upsets, the addition of substantial amounts of an inert gas, such as nitrogen is not required. In addition, the use of the present mixing device considerably increases the flexibility of the downstream operation.

Generally, the oxygen-containing gaseous stream, consisting of essentially pure oxygen, air, or oxygen diluted with an inert gas, will enter the casing longitudinally, while the gaseous organic substrate will enter transversely.

The apparatus of the present invention, in achieving an even distribution of the velocity of the gaseous organic materials, has another important advantage. The oxygen-containing gas leaving the tubes is now carried along by the vaporized organics whose flow velocity is the same over the entire cross-sectional area of the casing. The composition of the gas mixture will no longer vary over the cross-sectional area of the casing, so that any danger area, where an explosive mixture is present, is reduced to a minimum. Mixing of the gaseous streams to a uniform composition takes place rapidly.

An even distribution of the velocity and flow profiles is promoted by an even distribution of the openings over the surface area of the perforated partition(s). A promotive effect is also obtained when those openings are of the same size. It is preferred that the openings have a small area with respect to the cross-sectional area of the casing, generally no larger than about 54% of the cross sectional area of a tube. The total area of all the openings in the partition(s) is preferably at least equal to 57% of the total surface area of that partition. The openings may be of any shape, for instance, triangular, square, circular, etc. Where openings with straight, punched rims are employed, a larger total surface area for the openings, as a percentage of the cross-sectional area of the casing, is preferred than when openings having rounded rims on the upstream side are employed.

It is desirable that the distance from the mouths of the tubes, extending toward the outlet, to the partition situated closest thereto should be at least 10 times the diameter of an opening in a perforated partition. Preferably that distance is at least 20 times the said diameter. Where non-circular opennngs are present in the perforated partition, the diameter referred to immediately above is the "equivalent diameter," defined as four times the cross sectional area of an opening divided by its perimeter. This diameter-distance relationship insures that ripples in the velocity and flow distributions, caused by the jets of gas—of which a large number are normally present—issuing from the partition openings, may be damped out before the hydrocarbon-containing gaseous stream reaches the mouths of the tubes.

An even more uniform distribution of velocity and flow profiles is favored by the inclusion of two perforated partitions, preferably located at a distance from each other at least 10 times the diameter of an opening in a partition. More than two preforated partitions may be included in the casing; however, in order to avoid an excessive pressure drop, the total area of all the openings in any one partition should be larger than when only one or two partitions are included in the mixing device.

The tubes may extend through the partition(s) in such a way that around each tube there remains a free annular space. This may have the advantage that the suction exerted by the hydrocarbon-containing stream at the ends of the tubes is promoted by the jet effect of the gas stream from the annular spaces. However, differences in that jet effect between the different tubes may locally occur, as a result of which back diffusion or back-flow of gas from the outlet to the inlet of the oxygen-containing gas will be strongly enhanced. For this reason these annular spaces are generally ommitted or sealed off.

In order to diminish further the chance of back-flow or back diffusion, the pressure drop of the longitudinally entering gas should not be too small. This pressure drop may be increased by extending the tubes through the imperforate partition upstream thereof at least 10 times the diameter of the tube. Alternatively, or in addition to extending the tubes through the imperforate partition, the pressure drop immediately upstream of the imperforate partition may be increased by causing the longitudinally entering gas stream to flow through a perforated baffle containing a plurality of uniformly distributed orifices. In addition to distributing the first gas stream uniformly across the casing cross section, the pressure drop through the orifices in the baffle results in increased velocity of the gas, further reducing the possibility of backflow of the second gas.

DETAILED DESCRIPTION OF THE DRAWING

Referring to the drawings, FIG. 1 depicts one embodiment of a general assembly of the device of the present invention in partial section. A first gaseous stream enters the mixing device longitudinally through nozzle 1 and thereafter passes through tubes 90. A second gaseous stream enters the mixing device through nozzle 2, passes through perforated partitions 140 and mixes with the first gaseous stream exiting tubes 90. The mixed gases pass along downstream casing section 120 and exit therefrom through outlet 3. Although two perforated partitions, 140 are indicated in FIG. 1, no criticality is to be attached thereto.

FIG. 2 is an enlarged section through the casing showing one arrangement of internals therein. The body of the casing consists of first inlet flange 10, elliptical head 20, flanges 50 and 70, T section 80, second inlet flange 160, and downstream casing section 120.

The operation of the mixing device of the present invention, as depicted in FIG. 2, is as follows. A first gaseous stream 1 enters the mixing device longitudinally through first inlet flange 10. In a preferred embodiment, this gaseous stream then passes through perforated baffle or inner head 40 to header chamber 45. Perforated baffle 40 contains a plurality of uniformly distributed orifices which serve to distribute the first gaseous stream within elliptical head 20 and to induce some pressure drop. The induced pressure drop results in a higher velocity of the first gaseous stream within header chamber 45.

A sampling device 30, for monitoring backflow of gasses into elliptical head 20, if any, may extend into header chamber 45. Held between flanges 50 and 70 is an imperforate partition, or tubesheet, 60. Tubes 90 are supported by, at their upstream end, and pass through, imperforate partition 60. Tubes 90 may be given additional support by struts or stiffening bars 100. The bundle of tubes, uniformly distributed across the cross section of the casing, passes through perforated partitions 140. The perforated partitions are strengthened on their outer perimeters by stiffening rings 130. Centering lugs 150 align the tubes within the downstream casing section 120.

A second gas 2 to be mixed enters the mixing device through a second inlet flange 160. Downstream of T section 80, flow of the second gas becomes uniformly distributed across the cross section of downstream casing section 120 after passing through perforated partitions 140. The first gaseous stream, after leaving header chamber 45, passes through tubes 90, and exits therefrom to mix with the second gaseous stream flowing around them. It will be evident from FIG. 2 that no contact occurs between the gaseous streams to be mixed until the downstream end of tubes 90.

FIG. 3 is a section taken along line 3—3 of FIG. 2, and shows a suitable perforated partition assembly. Perforated partition 140, strengthened on its outer perimeter by stiffening ring 130 and through which tubes 90 pass, is aligned within downstream casing section 120 by centering lugs 150. Openings in perforated partition 140 may be square, as shown in FIG. 3, or they may be circular, triangular, or any other shape achievable by conventional manufacturing techniques. The exact shape of the openings is not critical; however, the openings should be uniformly distributed across perforated partition 140.

EXAMPLES

Example I

The mixing device of the present invention was compared with a conventional, commercially employed mixing apparatus. Each was approximately 12 inches in diameter and contained an equal number of tubes. The conventional apparatus contained a single partition separating T section 80 and outlet 3. Gas entering second inlet flange 160 passed to outlet 3 through annular spaces around the tubes. Two perforated partitions were contained in the device according to the present invention, and were placed 12 centimeters apart. The perforated partitions of the apparatus of the present invention had holes, approximately 12 millimeters in diameter, uniformly distributed across each partition. Under specific process conditions, for maintaining an explosive-free composition in chamber 8 the addition of approximately 1900 cubic meters of nitrogen per hour was required by the conventional device. Under otherwise identical conditions, only 600 cubic meters per hour of nitrogen were required using the apparatus of the present invention. Under varying flow conditions it was found, in additional experiments, that the mixing device of the present invention required between about ⅓ to about ½ as much purge gas in order to achieve non-detonable compositions in header chamber 45 as the conventional apparatus.

Example II

The velocity profiles 2 inches downstream from the mouths of the tubes in downstream casing section 120 for the devices described in the preceding example were examined by means of a Pitot tube. For identical flows of gases through each apparatus, the gas velocity should have been approximately 230 feet per second. For the mixing device of the present invention, the velocity ranged between about 205 and 250 feet per second. The velocity profile of the conventional apparatus was much more erratic, varying between approximately 123 and 150 feet per second.

We claim as our invention:

1. An apparatus for effecting the intimate mixing of two gaseous streams, which comprises a casing containing
   (a) at one end of the casing, a first inlet for the introduction of a first gaseous stream;
   (b) downstream from the first inlet, a second inlet in the side of the casing, for the introduction of a second gaseous stream;
   (c) an outlet from the casing downstream of the second inlet;
   (d) an imperforate partition positioned between the first and second inlets;
   (e) two perforated partitions positioned between the second inlet and the outlet, the perforations being evenly distributed over the surface area of each perforated partition; and
   (f) a number of tubes, supported by and passing through at one end of the imperforate partition and at the other end, said perforated partitions; there being no annular spaces between said tubes and said partitions, and said tubes extending downstream from the perforated partitions a distance of at least 10 times the diameter of an opening in said perforated partitions.

2. The apparatus of claim 1 wherein the openings in said perforated partitions are uniformly distributed and each opening's area is no larger than about 54% of the cross sectional area of a tube.

3. The apparatus of claim 2 wherein the total area of all openings in said partitions is at least 57% of the total surface area of each perforated partition.

4. The apparatus of claim 1 wherein said distance is approximately 20 times the said diameter.

5. The apparatus of claim 1 wherein, to induce pressure drop upstream of the imperforate partitions and to uniformly distribute the first gaseous stream across the casing cross section, a perforated baffle, containing a plurality of uniformly distributed orifices, is positioned between the first inlet and the imperforate partitions.

6. The apparatus of claim 1 wherein the tubes passing through the imperforate partitions extend upstream thereof at least 10 times the diameter of a tube.

References Cited

UNITED STATES PATENTS

| 2,618,534 | 11/1952 | Mrstik | 23—285 |
| 3,450,800 | 6/1969 | Smith et al. | 261—76 X |
| 694,081 | 2/1902 | Weis et al. | 261—115 |

JAMES H. TAYMAN, Jr., Primary Examiner

U.S. Cl. X.R.

260—348.5 R, 348.5 V, 687; 23—285, 283; 165—174; 239—428, 590.3; 259—4; 261—76, 115